United States Patent
Kadono et al.

(10) Patent No.: US 11,489,170 B2
(45) Date of Patent: Nov. 1, 2022

(54) FUEL CELL SEPARATOR AND METHOD OF MANUFACTURING THE SAME

(71) Applicants: Sumitomo Riko Company Limited, Aichi (JP); TOYOTA JIDOSHA KABUSHIKI KAISHA, Aichi-ken (JP)

(72) Inventors: Hideya Kadono, Komaki (JP); Shigeo Nakanishi, Komaki (JP); Shinobu Yamaguchi, Komaki (JP); Hitoshi Tamura, Komaki (JP); Shinichi Haga, Komaki (JP); Motohiro Mizuno, Toyota (JP); Kenji Sato, Toyota (JP); Takuya Kurihara, Toyota (JP); Tomohiro Mazaki, Komaki (JP)

(73) Assignees: Sumitomo Riko Company Limited, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 198 days.

(21) Appl. No.: 17/109,095

(22) Filed: Dec. 1, 2020

(65) Prior Publication Data

US 2021/0194018 A1 Jun. 24, 2021

(30) Foreign Application Priority Data

Dec. 19, 2019 (JP) .............................. JP2019-229082

(51) Int. Cl.
*H01M 8/0221* (2016.01)
*H01M 8/0276* (2016.01)
*B29C 45/14* (2006.01)
*H01M 8/0258* (2016.01)
*B29L 31/34* (2006.01)

(52) U.S. Cl.
CPC ..... *H01M 8/0221* (2013.01); *B29C 45/14467* (2013.01); *H01M 8/0258* (2013.01); *H01M 8/0276* (2013.01); *B29L 2031/3468* (2013.01)

(58) Field of Classification Search
CPC ............. H01M 8/0221; H01M 8/0258; H01M 8/0276; B29C 45/14467; B29L 2031/3468
See application file for complete search history.

(56) References Cited

U.S. PATENT DOCUMENTS

2009/0239129 A1* 9/2009 Seido .................. H01M 8/2457
429/437
2016/0141637 A1 5/2016 Sato et al.

FOREIGN PATENT DOCUMENTS

JP 2014127393 7/2014
JP 2016095966 5/2016

* cited by examiner

*Primary Examiner* — Adam A Arciero
(74) *Attorney, Agent, or Firm* — JCIPRNET (57) ABSTRACT

A fuel cell separator includes a separator main body having a first surface and a second surface, and a first seal member disposed on the first surface. When a region on the first surface of the separator main body corresponding to an electrode member disposed on the second surface is defined as a power generation region, and a region on the first surface of the separator main body corresponding to an in-cell seal member is defined as a seal region, a displacement/vibration reducing member made of polymer is disposed at a part of the seal region. The displacement/vibration reducing member includes multiple protrusions and a coupling portion. When viewed in plan view, an axis line connecting the centers of the figures of the adjacent protrusions does not coincide with a center line passing through the widthwise center of the coupling portion. The coupling portion has a gate cut mark.

6 Claims, 6 Drawing Sheets

FUEL CELL SEPARATOR AND METHOD OF MANUFACTURING THE SAME

CROSS REFERENCE TO RELATED APPLICATIONS

This application claims the priority benefit of Japanese Patent Application No. 2019-229082, filed on Dec. 19, 2019. The entirety of the above-mentioned patent application is hereby incorporated by reference herein and made a part of this specification.

TECHNICAL FIELD

The present disclosure relates to a separator included in a fuel cell battery.

DESCRIPTION OF THE RELATED ART

A fuel cell battery includes cells each serving as a unit of power generation. Each cell includes an electrode member having a membrane electrode assembly (MEA), and separators holding the electrode member therebetween. The fuel cell battery is formed by fastening a stack of cells with a predetermined force from the opposite outer sides in the stacking direction. A fuel gas such as hydrogen or an oxidant gas such as air flows on one surface side of the separator in the thickness direction (stacking direction), and a coolant such as water flows on the other surface side. The separator has through holes extending therethrough in the thickness direction. The through holes serve as flow paths for a reaction gas and a coolant (hereinafter, either or both of the reaction gas and the coolant are referred to as "fluid"). A frame-shaped rubber seal member (rubber gasket) is disposed around the electrode member and between the adjacent separators. The seal member is bonded to the separator, and is compressed with a fastening force from the opposite outer sides in the stacking direction. This prevents the fluid from moving between the inside and outside of the frame defined by the seal member.

During operation of a fuel cell battery, the pressure of fluid flowing on one surface side of a separator is not always equal to the pressure of fluid flowing on the other surface side. That is, the differential pressure between the opposite sides of the separator varies. As a result, the separator is displaced or vibrates in the stacking direction. Thus, a load is applied to a seal member, so that the seal member may be separated from the separator. For example, if an in-cell seal member disposed around an electrode member is separated from the separator, leakage or mixing of a reaction gas to be supplied to each of anode and cathode electrodes occurs. This results in a reduction in power generation efficiency.

From the standpoint of reducing the displacement of a separator, for example, Japanese Unexamined Patent Application Publication No. 2014-127393 (JP 2014-127393 A) discloses a fuel cell stack including two or more cell modules as cell stacks, and a seal plate disposed between the cell modules. In the fuel cell stack, separator displacement reducing means is disposed between separators with the seal plate interposed therebetween. However, the separator displacement reducing means of JP 2014-127393 A is designed to be disposed between the cell modules (cell stacks) and to reduce the displacement of the separator due to the pulsation of power generation gas so as to reduce stress generated in an MEA. This separator displacement reducing means is not designed to reduce separation of the in-cell seal member from the separator. Moreover, the separator displacement reducing means disclosed in JP 2014-127393 A is merely resin protrusions (FIG. 7) having a thickness equal to the distance between the separators (cell modules), or flat plate-shaped ribs disposed on the seal plate (FIG. 13). JP 2014-127393 A does not disclose a method of manufacturing the separator displacement reducing means or problems that occur in the manufacturing process.

Meanwhile, from the standpoint of regulating the flow of fluid between a through hole and an internal flow path on a separator, Japanese Unexamined Patent Application Publication No. 2016-095966 (JP 2016-095966 A) discloses a fuel cell separator including a separator main body, and a flow regulating portion disposed between a fluid flow region and the through hole. The flow regulating portion includes a plurality of protrusions, and a coupling portion that has a thickness smaller than a thickness of the plurality of protrusions and that couples the protrusions. The flow regulating portion is designed to regulate the flow of fluid on the separator, and is not designed to reduce the displacement and vibration of the separator. JP 2016-095966 A discloses in paragraph [0007] that, since the plurality of protrusions are coupled with the coupling portion, the bonding area of the flow regulating portion is large, and it is therefore possible to reduce separation from the separator main body by a pressure caused by the flow of the fluid. However, this only relates to the bonding between the flow regulating portion and the separator main body, and reduction of separation of the in-cell seal member from the separator main body is not considered.

JP 2016-095966 A discloses that the flow regulating portion is formed by injection molding with a rubber material, but does not discuss problems that occur in the manufacturing process. For example, as illustrated in FIG. 5 of JP 2016-095966 A, if the flow regulating portion including a coupling portion having a flat plate shape and a plurality of columnar protrusions disposed thereon is formed by injection molding, short shots may occur in the protrusions. This is because the rubber material is viscous, and if a gate for injecting the rubber material is provided on the coupling portion (a portion of a mold for molding the coupling portion), small spaces for the protrusions are located immediately above the gate, so that the injected rubber material flows back. This is likely to result in short shots due to insufficient filling. Further, if the protrusions are disposed on the coupling portion, the flow path for the fluid that passes therethrough is narrowed by the thickness of the coupling portion. Accordingly, the distance (pitch) between the protrusions needs to be large enough to not inhibit the flow of the fluid (there is a limit on reducing the pitch).

SUMMARY

The present disclosure has been made in view of the circumstances described above, and provides a fuel cell separator capable of reducing the displacement and vibration of the separator without inhibiting the flow of fluid, during operation of a fuel cell battery, and a method of manufacturing the same.

(1) To solve the above problem, a fuel cell separator according to the present disclosure includes: a separator main body having a first surface on which a first fluid flows and a second surface on which a second fluid flows and that is bonded to an in-cell seal member disposed around an electrode member having a membrane electrode assembly; and a first seal member that is disposed on the first surface of the separator main body and that is in elastic contact with a counterpart member stacked on the separator main body;

in the fuel cell separator, when a region on the first surface of the separator main body corresponding to the electrode member disposed on the second surface is defined as a power generation region, and a region on the first surface of the separator main body corresponding to the in-cell seal member is defined as a seal region, a displacement/vibration reducing member made of polymer is disposed at a part of the seal region; the displacement/vibration reducing member includes a plurality of protrusions, and a coupling portion that has a thickness smaller than a thickness of the plurality of protrusions and that couples the protrusions; when the displacement/vibration reducing member is viewed in plan view, an axis line connecting centers of figures of the adjacent protrusions does not coincide with a center line passing through a widthwise center of the coupling portion; and the coupling portion has a gate cut mark formed when the displacement/vibration reducing member is molded.

The fuel cell separator according to the present disclosure includes the displacement/vibration reducing member. The displacement/vibration reducing member includes the plurality of protrusions, and the coupling portion that has a thickness smaller than a thickness of the plurality of protrusions. In the case where a fuel cell battery is formed by stacking cells, the protrusions are in elastic contact with a counterpart member (such as a separator included in another cell) stacked on the separator. Accordingly, even if the differential pressure of the fluid flowing on the opposite surfaces of the separator in the thickness direction varies during operation of the fuel cell battery, the displacement and vibration of the separator can be reduced. As a result, the separation of the first seal member and the in-cell seal member from the separator main body, on whose opposite surfaces they are disposed, can be reduced. When a region on the first surface of the separator main body corresponding to the electrode member disposed on the second surface is defined as a power generation region, and a region on the first surface of the separator main body corresponding to the in-cell seal member is defined as a seal region, the displacement/vibration reducing member is disposed at a part of the seal region. This is especially effective in reducing separation of the in-cell seal member disposed around the electrode member. As a result, leakage and mixing of a reaction gas to be supplied to each electrode of the electrode member are reduced, which prevents a reduction in power generation efficiency.

When the displacement/vibration reducing member is viewed in plan view, the axis line connecting the centers of the figures of the adjacent protrusions does not coincide with the center line passing through the widthwise center of the coupling portion. The "center of a figure" is the centroid of a figure when the figure is viewed in plan view. When the axis line of the protrusions does not coincide with the center line of the coupling portion, it means, in simple terms, that the protrusions and the coupling portion are offset when viewed in plan view.

As in the case of the rectifying portion illustrated in FIG. 5 of JP 2016-095966 A described above, if the protrusions are disposed on the center line of the coupling portion, and the displacement/vibration reducing member is configured such that the axis line of the protrusions coincides with the center line of the coupling portion, the polymer material flows back when injection molding is performed using a mold having a gate provided on a portion thereof for molding the coupling portion. If prevention of a backflow is the only purpose, the gate may be located between the protrusions, by increasing the distance (pitch) between the protrusions so as to increase the distance from the gate to the protrusions. However, if the pitch between the protrusions of the displacement/vibration reducing member is increased, the effect of reducing the displacement and vibration of the separator is reduced. Accordingly, to secure the effect of reducing the displacement and vibration of the separator, it is preferable to reduce the pitch within the range where the flow of the first fluid is not inhibited. Thus, in the case where the axis line of the protrusions coincides with the center line of the coupling portion, it is difficult to locate the gate between the protrusions.

Meanwhile, according to the displacement/vibration reducing member of the present disclosure, since the axis line of the protrusions does not coincide with the center line of the coupling portion when viewed in plan view, the protrusions can be located away from the gate provided on the portion of the mold for molding the coupling portion. Accordingly, even when the pitch of the protrusions is reduced, it is possible to prevent short shots that may occur in injection molding. Further, since the protrusions and the coupling portion are offset from each other, a flow path is easily secured between the protrusions. Therefore, the flow of the first fluid is less likely to be inhibited.

The coupling portion of the displacement/vibration reducing member has a gate cut mark resulting from gate cutting at the time of molding. This indicates that a gate of a mold is disposed at a portion where the coupling portion is formed, and a polymer material is injected from this portion.

(2) A method of manufacturing a fuel cell separator according to the present disclosure is a method of manufacturing the fuel cell separator of the present disclosure described in (1), in which the displacement/vibration reducing member and the first seal member are made of the same material. The method includes: molding the displacement/vibration reducing member and the first seal member integrally with the separator main body in a single injection molding process.

According to the method of manufacturing a fuel cell separator of the present disclosure, the displacement/vibration reducing member and the first seal member can be integrally molded with the separator main body in a single injection molding process. Accordingly, compared to the case where the displacement/vibration reducing member and the first seal member are molded separately and then bonded to the separator main body, it is possible to reduce the manufacturing steps. Consequently, it is possible to reduce the manufacturing time and cost. This improves the productivity of the fuel cell separator.

DETAILED DESCRIPTION OF THE EMBODIMENTS

Hereinafter, embodiments of a fuel cell separator and a method of manufacturing the same according to the present disclosure will be described.

First Embodiment

[Configuration of Fuel Cell Separator]

Figure 1:
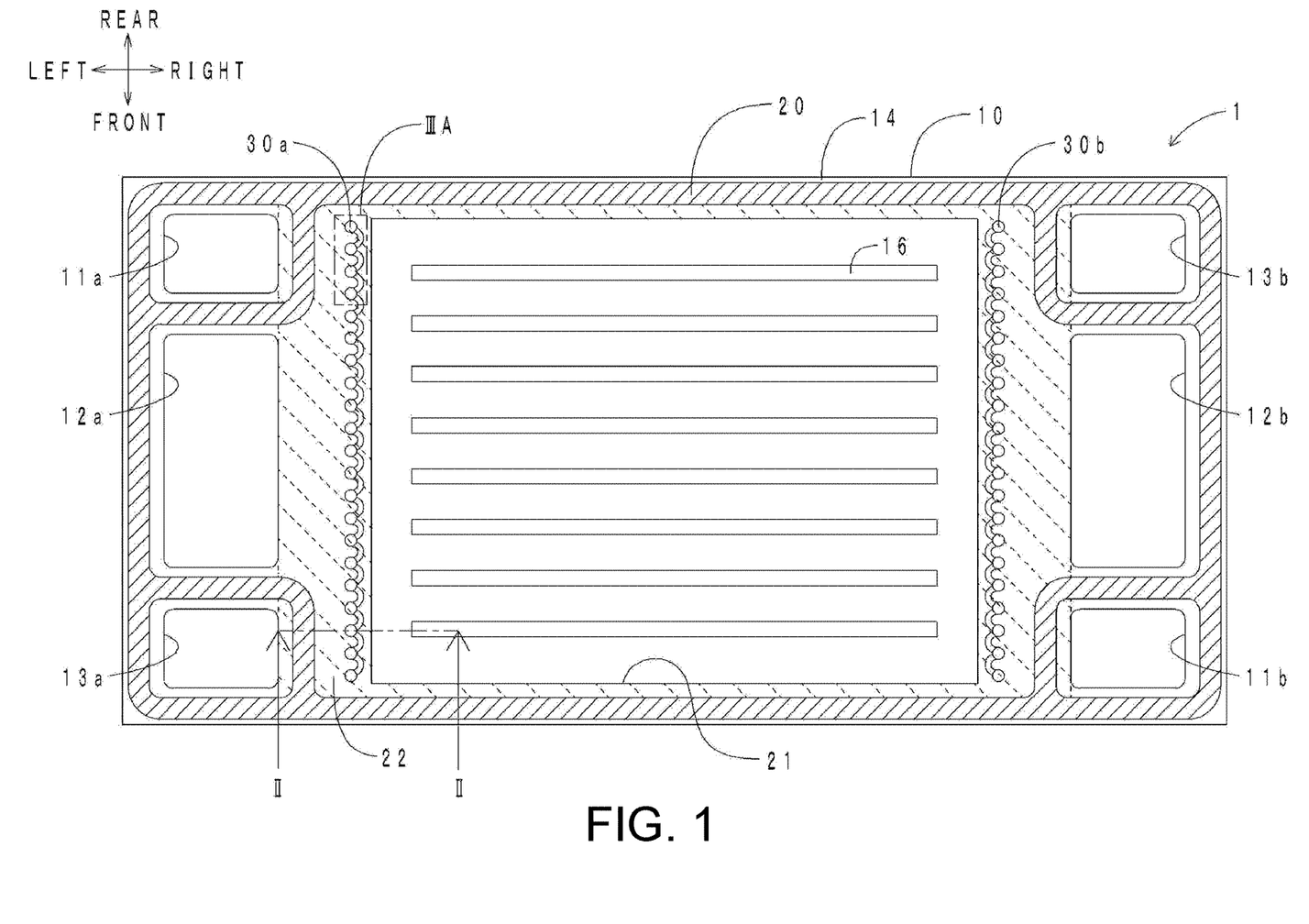
FIG. 1 is a top view of an anode-side separator according to a first embodiment.
Figure 2:
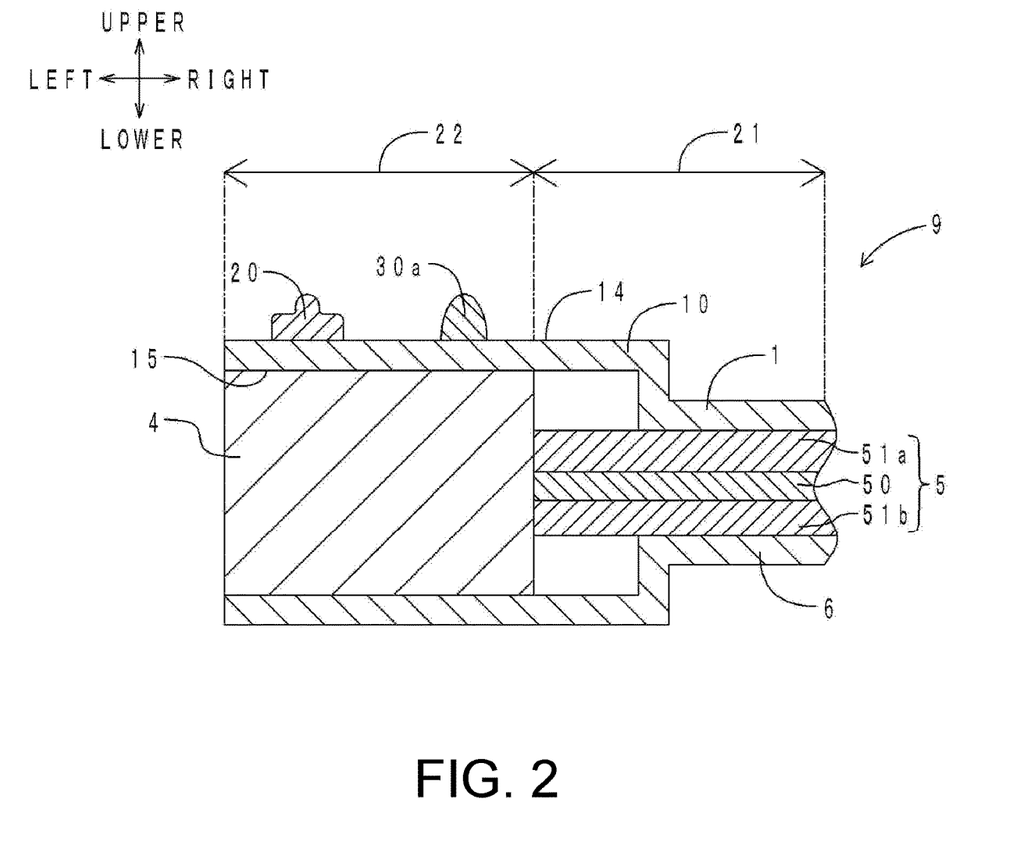
FIG. 2 is a cross-sectional view taken along II-II of FIG. 1 when a fuel cell is formed.
Figure 3A:
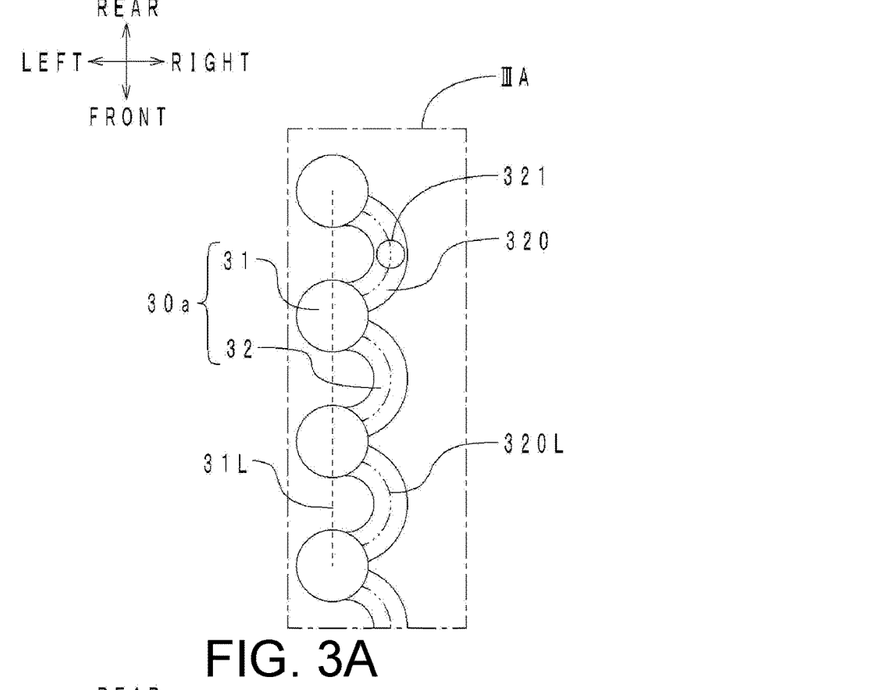
FIG. 3A is an enlarged view of an area IIIA of FIG. 1.
Figure 3B:
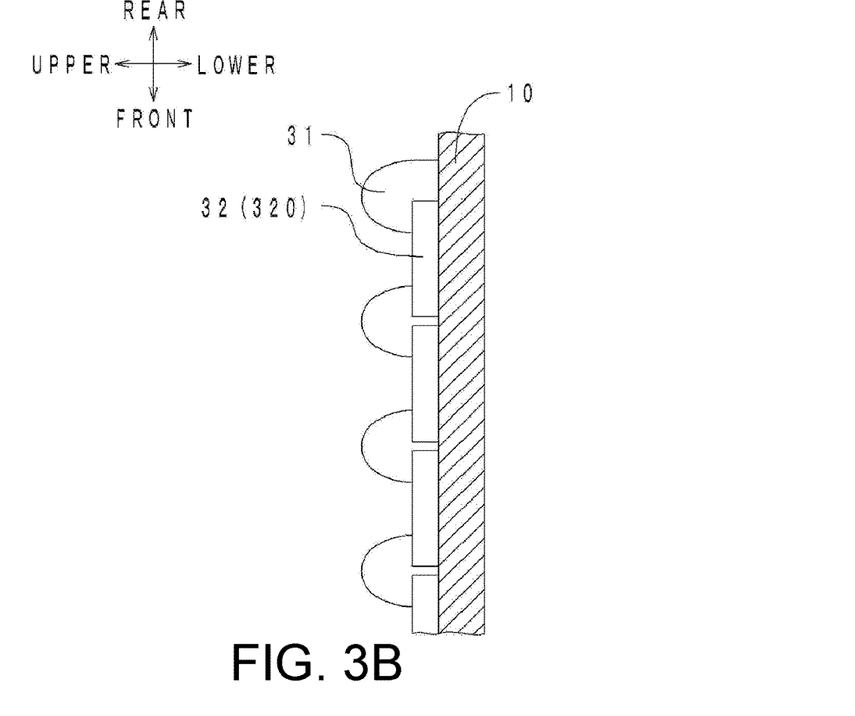
FIG. 3B is a right side view of FIG. 3A.

First, the configuration of a fuel cell separator according to the present embodiment will be described. In the present embodiment, the fuel cell separator is embodied as an anode-side separator included in a fuel cell. FIG. 1 illustrates a top view of the anode-side separator. FIG. 2 is a cross-sectional view taken along II-II of FIG. 1 when a fuel cell is formed. FIG. 3A illustrates an enlarged view of an area IIIA of FIG. 1. FIG. 3B illustrates a right side view of FIG. 3A. As for the directions in the drawings, the front-rear and lateral directions refer to the surface direction of the separator, and the vertical direction refers to the thickness direction and the stacking direction of the separator.

As illustrated in FIG. 1, an anode-side separator 1 includes a separator main body 10, a first seal member 20, and a pair of displacement/vibration reducing members 30a and 30b.

The separator main body 10 is made of titanium, and has a rectangular thin-plate shape. The separator main body 10 has six through holes extending therethrough in the thickness direction. Specifically, the separator main body 10 has, at its left side, an air supply hole 11a, a cooling water supply hole 12a, and a hydrogen supply hole 13a in this order from the rear. Furthers, the separator main body 10 has, at its right side, a hydrogen discharge hole 13b, a cooling water discharge hole 12b, and an air discharge hole 11b in this order from the rear.

The separator main body 10 has an upper surface 14 and a lower surface 15. A rectangular power generation region 21 is defined at the center portion of the upper surface 14. The power generation region 21 corresponds to the arrangement region of an electrode member 5 stacked on the lower surface 15 side when a fuel cell 9 including the anode-side separator 1 is formed. The electrode member 5 will be described below. A cooling water flow path 16 through which cooling water flows is formed in the power generation region 21. A seal region 22 is defined on the outer side of the power generation region 21 in the surface direction. The seal region 22 corresponds to the arrangement region of an in-cell seal member 4 stacked on the lower surface 15 side when the fuel cell 9 including the anode-side separator 1 is formed. The in-cell seal member 4 will be described below. For purposes of illustration, the seal region 22 (excluding a portion overlapping the first seal member 20) is indicated by dotted-line hatching in FIG. 1.

The first seal member 20 is disposed around the peripheral edge of the upper surface 14 of the separator main body 10 and the six through holes (the air supply hole 11a, the air discharge hole 11b, the cooling water supply hole 12a, the cooling water discharge hole 12b, the hydrogen supply hole 13a, and the hydrogen discharge hole 13b). The first seal member 20 is made of ethylene-propylene-diene rubber (EPDM), and has a rectangular frame shape. The first seal member 20 is in elastic contact with a counterpart member (a cathode-side separator of another cell) stacked on the upper surface 14 of the separator main body 10 (the anode-side separator 1). For purposes of illustration, in FIG. 1, the first seal member 20 is indicated by solid-line hatching.

A fuel gas flow path through which fuel gas flows is formed in the lower surface 15 of the separator main body 10. The lower surface 15 is bonded to the in-cell seal member 4. The configuration of the fuel cell 9 including the anode-side separator 1, particularly the configuration of the electrode member 5 and the in-cell seal member 4, will now be described with reference to a partial cross-sectional view taken along II-II of FIG. 1.

As illustrated in FIG. 2, a fuel cell 9 is formed by stacking the in-cell seal member 4, the electrode member 5, and a cathode-side separator 6, on the anode-side separator 1. The in-cell seal member 4 is made of EPDM, and has a rectangular frame shape as viewed from the above. The electrode member 5 is disposed on the inner side of the in-cell seal member 4. The in-cell seal member 4 is bonded to the outer periphery of the electrode member 5. The electrode member 5 includes a membrane electrode assembly (MEA) 50, and a pair of porous layers 51a and 51b with the MEA 50 interposed therebetween. The in-cell seal member 4 has an upper surface bonded to the lower surface 15 of the separator main body 10 (the anode-side separator 1), and a lower surface bonded to the upper surface of the cathode-side separator 6.

The upper surface 14 of the separator main body 10 is included in the concept of a "first surface" of the present disclosure, and cooling water is included in the concept of a "first fluid" of the present disclosure. The lower surface 15 of the separator main body 10 is included in the concept of a "second surface" of the present disclosure, and fuel gas is included in the concept of a "second fluid" of the present disclosure.

Referring back to FIG. 1, the anode-side separator 1 includes the pair of displacement/vibration reducing members 30a and 30b facing each other in the lateral direction. The displacement/vibration reducing member 30a is disposed in the seal region 22 on the outer left side of the power generation region 21 in the surface direction. The displacement/vibration reducing member 30a is disposed near the power generation region 21 so as to extend along the left side of the power generation region 21. The displacement/vibration reducing member 30a is disposed between the three through holes (the air supply hole 11a, the cooling water supply hole 12a, and the hydrogen supply hole 13a) at the left of the separator main body 10 and the power generation region 21.

The displacement/vibration reducing member 30b is disposed in the seal region 22 on the outer right side of the power generation region 21 in the surface direction. The displacement/vibration reducing member 30b is disposed near the power generation region 21 so as to extend along the right side of the power generation region 21. The displacement/vibration reducing member 30b is disposed between the three through holes (the air discharge hole 11b, the cooling water discharge hole 12b, and the hydrogen discharge hole 13b) at the right side of the anode-side separator 1 and the power generation region 21. The displacement/vibration reducing members 30a and 30b are symmetrical to each other, and have the same configuration in terms of material, shape, and so on. Therefore, the following describes only the displacement/vibration reducing member 30a.

The displacement/vibration reducing member 30a is made of EPDM, the same material as the first seal member 20. As enlarged in FIG. 3A, the displacement/vibration reducing member 30a includes a plurality of protrusions 31 and a coupling portion 32. All of the plurality of protrusions 31 have the same shape and size. Referring to the right side view illustrated in FIG. 3B, each protrusion 31 has a hill shape with a circular bottom and a convex top. The thickness of the protrusions 31 is equal to the thickness of the first seal member 20.

The coupling portion 32 includes a plurality of coupling pieces 320. Each coupling piece 320 is disposed between corresponding adjacent protrusions 31. All of the plurality of coupling pieces 320 have the same shape and size. The thickness of the coupling pieces 320 is less than the thickness of the protrusions 31. The ratio of the thickness of the coupling pieces 320 to the thickness of the protrusions 31 (coupling portion thickness/protrusion thickness) is 0.3.

When viewed in plan view from the above, the coupling piece 320 has a semi-annular shape, and couples the adjacent protrusions 31 to each other while forming a curve. The plurality of protrusions 31 are continuously coupled to each other via the coupling pieces 320. Here, "continuously coupled" means that the protrusions 31 and the coupling pieces 320 are alternately coupled in the order of "protrusion 31—coupling piece 320—protrusion 31", without arranging the coupling pieces 320 in succession. When the upper surface 14 of the anode-side separator 1 is viewed in plan view, an axis line 31L (indicated by the dotted line in FIG. 3A) connecting the centers of the figures of the adjacent protrusions 31 (the centroids of the figures in plan view) does not coincide with a center line 320L (indicated by the two-dot chain line in FIG. 3A) connecting the widthwise centers of the coupling pieces 320.

As will be described below, the displacement/vibration reducing member 30a is injection-molded together with the first seal member 20. At the time of molding, a rubber material is injected into a cavity of a predetermined coupling piece 320 from a gate of a mold, and gate cutting is performed after the molding. Thus, a gate cut mark 321 is formed on the upper surfaces of some coupling pieces 320 of the plurality of coupling pieces 320, as indicated by a circle in FIG. 3A.

[Method of Manufacturing Fuel Cell Separator]

Figure 4A:
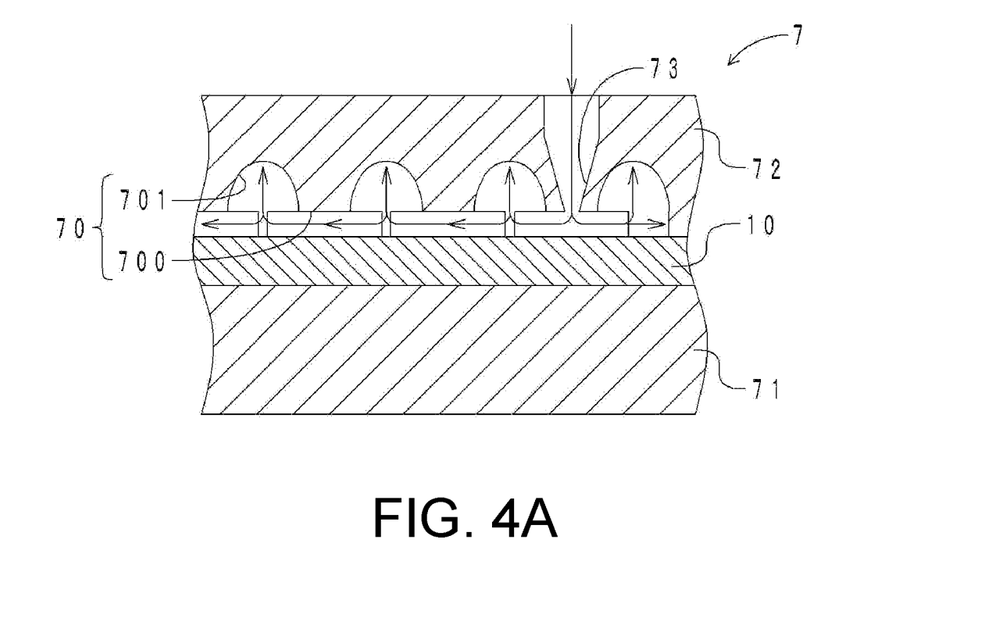
FIG. 4A is a vertical partial sectional view illustrating a clamping state of a mold for manufacturing the anode-side separator.
Figure 4B:
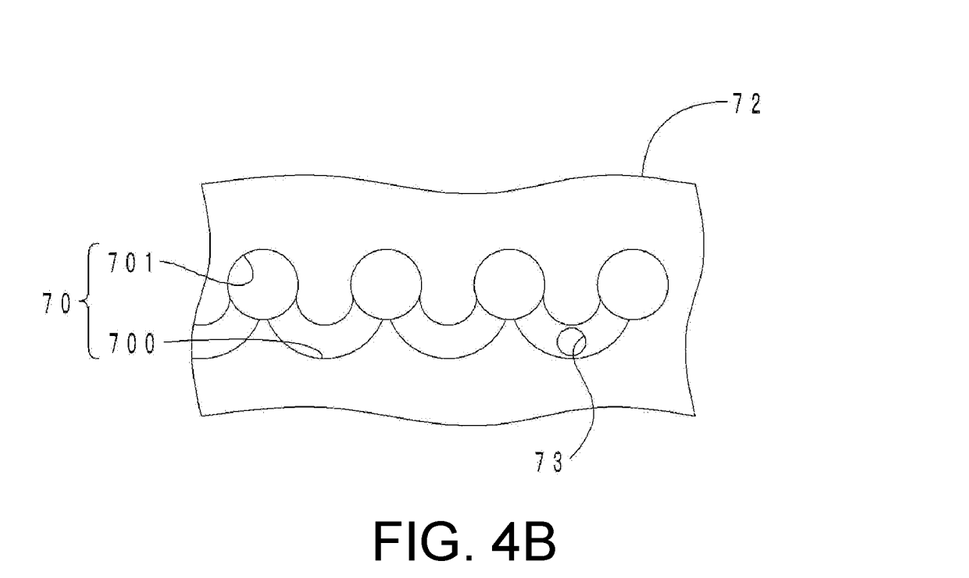
FIG. 4B is a partial plan view of a mold surface of a second mold included in the mold.

In the following, a method of manufacturing the fuel cell separator of the present embodiment will be described. The anode-side separator 1 is manufactured by molding the displacement/vibration reducing members 30a and 30b and the first seal member 20 integrally with the separator main body 10 in a single injection molding process. FIG. 4A is a vertical partial sectional view illustrating a clamping state of a mold for manufacturing the anode-side separator 1. FIG. 4B is a partial plan view of a mold surface of a second mold included in the mold.

As illustrated in FIGS. 4A and 4B, a mold 7 includes a first mold 71 and a second mold 72. The separator main body 10 is disposed in the first mold 71. The lower surface (mold surface) of the second mold 72 has recess portions for forming the displacement/vibration reducing members 30a and 30b and the first seal member 20. Of these, a recess portion 70 for forming the displacement/vibration reducing member 30a is illustrated in FIGS. 4A and 4B. The recess portion 70 includes coupling piece recess portions 700 for the coupling pieces 320 of the displacement/vibration reducing member 30a, and protrusion recess portions 701 for the protrusions 31. A gate 73 is connected to some of the coupling piece recess portions 700. A rubber material is injected into the recess portion 70 through the gate 73.

First, the mold 7 is clamped, and a rubber material containing EPDM as a rubber component is injected from the nozzle of a molding machine into the recess portion 70 (cavity) through a runner (not illustrated) and the gate 73 of the second mold 72. The rubber material has been heated to about 80° C. As indicated by the arrows in FIG. 4A, the injected rubber material fills the coupling piece recess portion 700 connected to the gate 73, flows in and fills the adjacent protrusion recess portion 701, and then flows in the next adjacent coupling piece recess portion 700. In this manner, the rubber material sequentially fills the entire recess portion 70 and cures. After that, the mold 7 is opened, and gate cutting is performed. Thus, the anode-side separator 1 (an integrally molded article of the displacement/vibration reducing members 30a and 30b, the first seal member 20, and the separator main body 10) is completed.

[Effects of Fuel Cell Separator]

In the following, the effects of the fuel cell separator of the present embodiment will be described. The anode-side separator 1 includes the displacement/vibration reducing members 30a and 30b. Since the displacement/vibration reducing members 30a and 30b are symmetrical to each other, and provide the same effects, the following describes only the displacement/vibration reducing member 30a. In the case where a fuel cell battery is formed by stacking the fuel cells 9, the protrusions 31 of the displacement/vibration reducing member 30a are in elastic contact with a counterpart member such as a separator included in another cell. Accordingly, even if the differential pressure of the fluid flowing on the opposite surfaces of the anode-side separator 1 in the thickness direction varies during operation of the fuel cell battery, the displacement and vibration of the anode-side separator 1 are reduced. As a result, the separation of the first seal member 20 and the in-cell seal member 4 from the separator main body 10, on whose opposite surfaces they are disposed, can be reduced.

The displacement/vibration reducing member 30a is disposed at a part of the seal region 22 (a region corresponding to the in-cell seal member 4). Specifically, the displacement/vibration reducing member 30a is disposed near the power generation region 21 so as to extend along the left side of the power generation region 21, in the seal region 22 between the three through holes (the air supply hole 11a, the cooling water supply hole 12a, and the hydrogen supply hole 13a) at the left of the separator main body 10 and the power generation region 21. This is effective in reducing separation of the in-cell seal member 4 bonded to the lower surface 15 of the separator main body 10. Especially, since the first seal member 20 is not disposed between the cooling water supply hole 12a and the power generation region 21, it is possible to effectively reduce the displacement and vibration of the anode-side separator 1 by locating the displacement/vibration reducing member 30a therebetween.

The coupling portion 32 (the coupling pieces 320) of the displacement/vibration reducing member 30a has a gate cut mark 321. That is, when performing molding by injection molding, a rubber material as the raw material is injected into a portion for forming the coupling portion 32. Here, the plurality of protrusions 31 are continuously coupled to each other via the coupling pieces 320. In this case, the rubber material injected into the portion for forming the coupling portion 32 fills the cavity in the order of "coupling piece 320→protrusion 31→coupling piece 320". This makes it possible to fill the cavity (recess portion 70) of the mold 7 while removing air therefrom. Accordingly, defects such as short shots are less likely to occur.

In the displacement/vibration reducing member 30a, the axis line 31L of the protrusions 31 does not coincide with the center line 320L of the coupling portion 32 when viewed in plan view from the above. Since the protrusions 31 and the coupling portion 32 are not in the same line, even when a gate is provided on the portion of the mold for molding the coupling portion, it is possible to secure a large distance from the gate to the protrusions. Accordingly, short shots due to back-flow are less likely to occur. Further, since the protrusions 31 and the coupling portion 32 are offset from each other, it is easy to secure a flow path between the protrusions 31. Therefore, the flow of cooling water is less likely to be inhibited.

The ratio of the thickness of the coupling pieces 320 to the thickness of the protrusions 31 (coupling portion thickness/protrusion thickness) is 0.3. Therefore, it is possible to secure a desired flow path, so that the flow of cooling water is less likely to be inhibited.

Since the displacement/vibration reducing member 30a is made of the same material as the first seal member 20, these two components can be molded together with an injection molding method or the like. In the present embodiment, the displacement/vibration reducing members 30a and 30b and the first seal member 20 are integrally molded with the separator main body 10 in a single injection molding process. Accordingly, compared to the case where the displacement/vibration reducing members 30a and 30b and the first seal member 20 are molded separately and then bonded to the separator main body 10, it is possible to reduce the manufacturing steps. Consequently, it is possible to reduce the manufacturing time and cost. This improves the productivity of the fuel cell separator.

Second Embodiment

Figure 5:
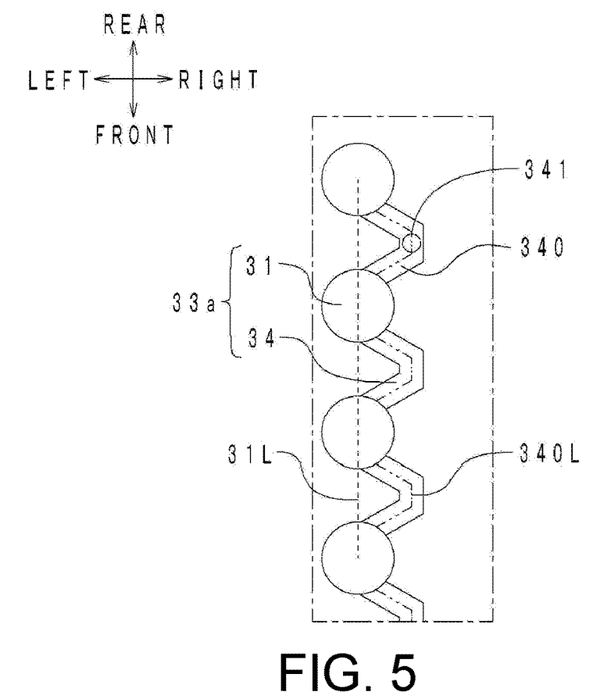
FIG. 5 is a partial enlarged view of a displacement/vibration reducing member of an anode-side separator as viewed from the above according to a second embodiment.

A fuel cell separator of the present embodiment differs from the fuel cell separator of the first embodiment in the shape of a displacement/vibration reducing member and a method of manufacturing a separator. The following mainly describes the differences. In the present embodiment, similar to the first embodiment, a pair of displacement/vibration reducing members facing each other in the lateral direction is provided. The displacement/vibration reducing members have the same configuration. Therefore, the following describes only a displacement/vibration reducing member 33a disposed on the left side of the separator main body. FIG. 5 illustrates a partial enlarged view of the displacement/vibration reducing member as viewed from the above. FIG. 5 corresponds to the enlarged view of the area IIIA of the above-mentioned FIG. 1 (the above-mentioned FIG. 3A). In FIG. 5, elements corresponding to those in FIG. 3A are denoted by the same reference numerals.

As illustrated in FIG. 5, the displacement/vibration reducing member 33a includes a plurality of protrusions 31 and a coupling portion 34. The plurality of protrusions 31 are the same as those of the first embodiment, and therefore will not be described herein. The coupling portion 34 includes a plurality of coupling pieces 340. Each coupling piece 320 is disposed between corresponding adjacent protrusions 31. All of the plurality of coupling pieces 340 have the same shape and size. The thickness of the coupling pieces 340 is less than the thickness of the protrusions 31. The ratio of the thickness of the coupling pieces 340 to the thickness of the protrusions 31 (coupling portion thickness/protrusion thickness) is 0.3.

When viewed in plan view from the above, the coupling piece 340 has an angular U-shape, and couples the adjacent protrusions 31 to each other with connected straight lines in the shape of a trapezoid. The plurality of protrusions 31 are continuously coupled to each other via the coupling pieces 340. That is, the protrusions 31 and the coupling pieces 340 are alternately arranged without arranging the coupling pieces 340 in succession. When the upper surface of the anode-side separator is viewed in plan view, an axis line 31L (indicated by the dotted line in FIG. 5) connecting the centers of the figures of the adjacent protrusions 31 does not coincide with a center line 340L (indicated by the two-dot chain line in FIG. 5) connecting the widthwise centers of the coupling pieces 340.

In the present embodiment, a preformed first seal member is first placed on the separator main body. Then, a displacement/vibration reducing member is injection-molded. In this step, the first seal member is cross-linked by heat, and is integrated with the separator main body, together with the displacement/vibration reducing member. When injection-molding the displacement/vibration reducing member 33a, a rubber material is injected into a cavity of a predetermined coupling piece 340 from a gate of a mold, and fills the cavity in the order of "coupling piece 340→protrusion 31→coupling piece 340". After the molding, gate cutting is performed. Thus, a gate cut mark 341 is formed on the upper surfaces of some coupling pieces 340 of the plurality of coupling pieces 340, as indicated by a circle in FIG. 5.

Elements of the fuel cell separator of the present embodiment identical to those of the fuel cell separator of the first embodiment provide the same effects. In the anode-side separator of the present embodiment, the coupling piece 340 of the displacement/vibration reducing member 33a has an angular U-shape, and couples the adjacent protrusions 31 to each other with straight lines. Even with this configuration, the protrusions 31 of the displacement/vibration reducing member 33a are in elastic contact with a counterpart member such as a separator included in another cell. Accordingly, even if the differential pressure of the fluid flowing on the opposite surfaces of the anode-side separator in the thickness direction varies during operation of the fuel cell battery, the displacement and vibration of the anode-side separator are reduced. As a result, the separation of the first seal member and the in-cell seal member from the separator main body, on whose opposite surfaces they are disposed, can be reduced.

Third Embodiment

Figure 6:
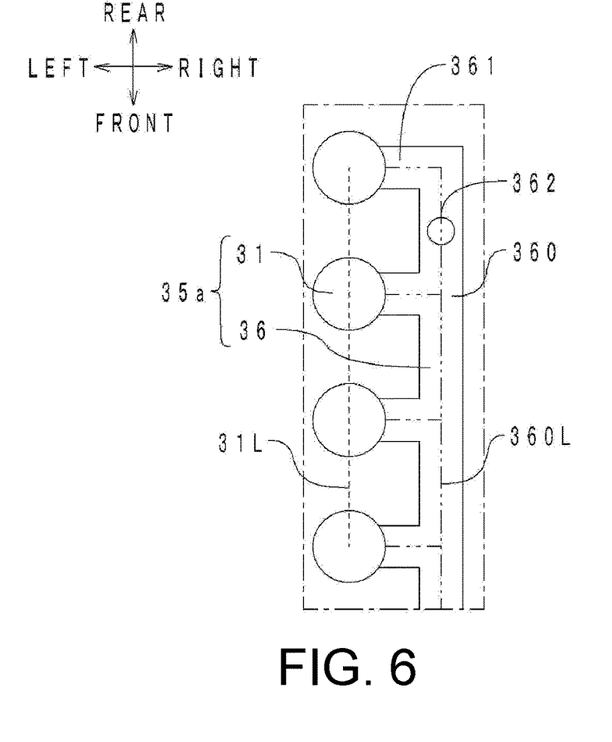
FIG. 6 is a partial enlarged view of a displacement/vibration reducing member of an anode-side separator as viewed from the above according to a third embodiment.

A fuel cell separator of the present embodiment differs from the fuel cell separator of the first embodiment in the shape of a displacement/vibration reducing member. The following mainly describes the differences. In the present embodiment, similar to the first embodiment, a pair of displacement/vibration reducing members facing each other in the lateral direction is provided. The displacement/vibration reducing members have the same configuration. Therefore, the following describes only a displacement/vibration reducing member 35a disposed on the left side of the separator main body. FIG. 6 illustrates a partial enlarged view of the displacement/vibration reducing member as viewed from the above. FIG. 6 corresponds to the enlarged view of the area IIIA of the above-mentioned FIG. 1 (the above-mentioned FIG. 3A). In FIG. 6, elements corresponding to those in FIG. 3A are denoted by the same reference numerals.

As illustrated in FIG. 6, the displacement/vibration reducing member 35a includes a plurality of protrusions 31 and a coupling portion 36. The plurality of protrusions 31 are the same as those of the first embodiment, and therefore will not be described herein. The coupling portion 36 couples the plurality of protrusions 31 to each other. The coupling portion 36 includes a stem portion 360 and a plurality of branch portions 361. The stem portion 360 has a band shape, and extends in the front-rear direction. Each of the plurality of branch portions 361 linearly extends leftward from the stem portion 360, and is disposed between the stem portion 360 and the corresponding protrusion 31. The thickness of the stem portion 360 is equal to the thickness of the plurality of branch portions 361. The thickness of the coupling portion 36 (the stem portion 360 and the branch portions 361) is less than the thickness of the protrusions 31. The ratio of the thickness of the coupling portion 36 to the thickness of the protrusions 31 (coupling portion thickness/protrusion thickness) is 0.3.

When the upper surface of the anode-side separator is viewed in plan view, an axis line 31L (indicated by the dotted line in FIG. 6) connecting the centers of the figures of the adjacent protrusions 31 does not coincide with a center line 360L (indicated by the two-dot chain line in FIG. 6) passing through the widthwise center of the coupling portion 36.

The displacement/vibration reducing member 35a is injection-molded together with the first seal member. At the time of molding, a rubber material is injected to a predetermined position of the cavity of the stem portion 360 (coupling portion 36) from a gate of a mold. The injected rubber material branches off from the stem portion 360 into the branch portions 361 to flow into the protrusions 31, while filling the stem portion 360 that is continuous in the front-rear direction. Eventually, the rubber material spreads throughout the displacement/vibration reducing member 35a and cures. After opening the mold, gate cutting is performed, so that a gate cut mark 362 is formed on the upper surface of the stem portion 360, as indicated by a circle in FIG. 6.

Elements of the fuel cell separator of the present embodiment identical to those of the fuel cell separator of the first embodiment provide the same effects. In the anode-side separator of the present embodiment, the coupling portion 36 of the displacement/vibration reducing member 35a includes the stem portion 360 and the branch portions 361 branching off from the stem portion 360. Even with this configuration, the protrusions 31 of the displacement/vibration reducing member 35a are in elastic contact with a counterpart member such as a separator included in another cell. Accordingly, even if the differential pressure of the fluid flowing on the opposite surfaces of the anode-side separator in the thickness direction varies during operation of the fuel cell battery, the displacement and vibration of the anode-side separator are reduced. As a result, the separation of the first seal member and the in-cell seal member from the separator main body, on whose opposite surfaces they are disposed, can be reduced.

Fourth Embodiment

Figure 7:
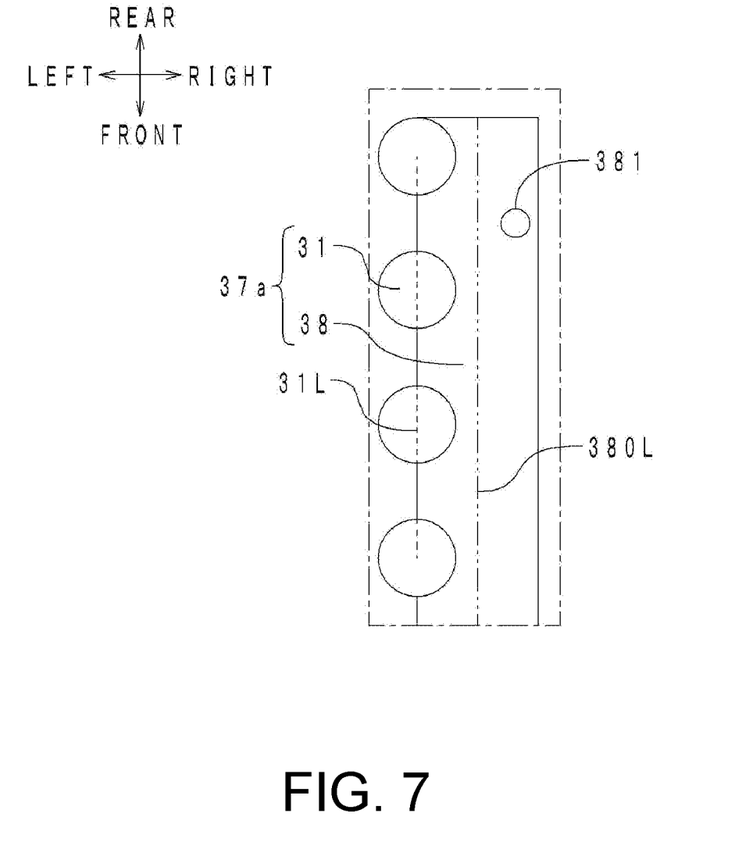
FIG. 7 is a partial enlarged view of a displacement/vibration reducing member of an anode-side separator as viewed from the above according to a fourth embodiment.

A fuel cell separator of the present embodiment differs from the fuel cell separator of the first embodiment in the shape of a displacement/vibration reducing member. The following mainly describes the differences. In the present embodiment, similar to the first embodiment, a pair of displacement/vibration reducing members facing each other in the lateral direction is provided. The displacement/vibration reducing members have the same configuration. Therefore, the following describes only a displacement/vibration reducing member 37a disposed on the left side of the separator main body. FIG. 7 illustrates a partial enlarged view of the displacement/vibration reducing member as viewed from the above. FIG. 7 corresponds to the enlarged view of the frame area of the above-mentioned FIG. 1 (the above-mentioned FIG. 3A). In FIG. 7, elements corresponding to those in FIG. 3A are denoted by the same reference numerals.

As illustrated in FIG. 7, the displacement/vibration reducing member 37a includes a plurality of protrusions 31 and a coupling portion 38. The plurality of protrusions 31 are the same as those of the first embodiment, and therefore will not be described herein. The coupling portion 38 couples the plurality of protrusions 31 to each other. The coupling portion 38 has a flat plate shape, and extends in the front-rear direction. The protrusions 31 are arranged to be spaced at predetermined intervals on the left end of the coupling portion 38. The thickness of the coupling portion 38 is less than the thickness of the protrusions 31. The ratio of the thickness of the coupling portion 38 to the thickness of the protrusions 31 (coupling portion thickness/protrusion thickness) is 0.3.

When the upper surface of the anode-side separator is viewed in plan view, an axis line 31L (indicated by the dotted line in FIG. 7) connecting the centers of the figures of the adjacent protrusions 31 does not coincide with a center line 380L (indicated by the two-dot chain line in FIG. 7) passing through the widthwise center of the coupling portion 38.

The displacement/vibration reducing member 37a is injection-molded together with the first seal member. At the time of molding, a rubber material is injected to a predetermined position of the cavity of the coupling portion 38 from a gate of a mold. The injected rubber material flows into the protrusions 31, while filling the coupling portion 38 that is continuous in the front-rear direction. Eventually, the rubber material spreads throughout the displacement/vibration reducing member 37a and cures. After opening the mold, gate cutting is performed, so that a gate cut mark 381 is formed on the upper surface of the coupling portion 38, as indicated by a circle in FIG. 7.

Elements of the fuel cell separator of the present embodiment identical to those of the fuel cell separator of the first embodiment provide the same effects. In the anode-side separator 1 of the present embodiment, the coupling portion 38 of the displacement/vibration reducing member 37a has the shape of a flat plate extending in the front-rear direction. Even with this configuration, the protrusions 31 of the displacement/vibration reducing member 37a are in elastic contact with a counterpart member such as a separator included in another cell. Accordingly, even if the differential pressure of the fluid flowing on the opposite surfaces of the anode-side separator in the thickness direction varies during operation of the fuel cell battery, the displacement and vibration of the anode-side separator are reduced. As a result, the separation of the first seal member and the in-cell seal member from the separator main body, on whose opposite surfaces they are disposed, can be reduced.

Other Embodiments

In the above, the embodiments of a fuel cell separator and a method of manufacturing the same according to the present disclosure have been described. However, embodiments are not particularly limited to the above embodiments.

The present disclosure can be embodied in various modified forms or improved forms that can be achieved by those skilled in the art.

In the above embodiments, the fuel cell separator is embodied as an anode-side separator. However, the fuel cell separator may be embodied as a cathode-side separator. The type of the first fluid and the second fluid is not limited. For example, the first fluid may be a coolant that is not water, and the second fluid may be an oxidant gas. The material of the separator main body is not limited to that of the above embodiments. Examples of the material include iron, stainless steel, and aluminum, in addition to titanium. Further, the configuration of the flow paths, the through holes, and so on formed in the separator main body is not limited. The configuration of the fuel cell including the fuel cell separator according to the present disclosure is not limited. For example, the pair of porous layers included in the electrode member may have a single-layer structure having only a gas diffusion layer, or may have a double-layer structure having a gas diffusion layer and a gas flow path layer.

The material, shape, and arrangement of the first seal member and the in-cell seal member are not limited. Any of the seal members may contain a cross-linker, a co-cross-linking agent, a processing aid, a softer, a reinforcing agent, and the like, in addition to a rubber component. Examples of suitable rubber components include silicone rubber, fluorine rubber, butyl rubber (IIR), ethylene-propylene rubber (EPM), acrylonitrile-butadiene rubber (NBR), hydrogenated acrylonitrile-butadiene rubber (H-NBR), styrene-butadiene rubber (SBR), and butadiene rubber (BR), in addition to EPDM.

The arrangement position of the displacement/vibration reducing member is not limited as long as the displacement/vibration reducing member is located within the seal region (a region corresponding to the in-cell seal member). The displacement/vibration reducing member may be arranged in one location, or may be provided in plurality so as to be arranged in a plurality of locations. For example, in the above embodiments, the first seal member is not disposed between each of the cooling water supply hole and the cooling water discharge hole (through holes for supplying or discharging the first fluid), and the power generation region. If a displacement/vibration reducing member is disposed in such a region where no first seal member is disposed, displacement and vibration of the separator are effectively reduced. Further, in the vicinity of the interface between the in-cell seal member and the electrode member, the in-cell seal member is easily separated from the separator main body. The part in the vicinity of the interface corresponds to a part of the seal region in the vicinity of the power generation region. Accordingly, if a displacement/vibration reducing member is disposed at a part of the seal region in the vicinity of the power generation region, separation of the in-cell seal member is effectively reduced.

The displacement/vibration reducing member includes the plurality of protrusions and the coupling portion. The displacement/vibration reducing member only needs to be configured such that the axis line connecting the centers of the figures of the adjacent protrusions does not coincide with the center line passing through the widthwise center of the coupling portion when viewed in plan view. The shape and size of the protrusion and coupling portion are not limited. For example, the shape of the protrusion may be a columnar shape such as a prism or a cylinder, or a pointed shape such as a pyramid or a circular cone, other than the hill shape of the above embodiments. When the protrusion has a hill shape, the bottom surface may have a polygonal shape or an oval shape, other than a circular shape, and the top may have a flat surface, other than a convex surface. Further, the protrusion may have multiple steps having different dimensions in the radial direction (surface direction). In the above embodiments, the protrusions are arranged in line such that the axis line extends linearly. However, the protrusions may be arranged such that the axis line is bent in a zigzag form. Each displacement/vibration reducing member may include two or more protrusions.

The shape of the coupling portion is not limited as long as the coupling portion couples the plurality of protrusions. The coupling portion may be arranged in succession as in the third and fourth embodiments described above, or may include a plurality coupling pieces that are disposed between the corresponding protrusions as in the first and second embodiments described above. In the case where the coupling portion includes a plurality of coupling pieces, the plurality of protrusions are continuously coupled to each other via the coupling pieces. In this case, when molding the displacement/vibration reducing member, it is possible to fill the cavity with a polymer material while removing air therefrom. Accordingly, defects such as short shots are less likely to occur. There may be a single gate cut mark or a plurality of gate cut marks on the coupling portion.

The thickness of the protrusions needs to be greater than the clearance between the separator and a counterpart member stacked thereon. The thickness of the protrusions may be appropriately set so as to have a pressure capable of reducing the displacement and vibration of the separator when assembling the fuel cell battery. For example, the thickness of the protrusions may be equal to, greater than, or less than the thickness of the first seal member. The thickness of the coupling portion is less than the thickness of the protrusions. The ratio of the thickness of the coupling portion to the thickness of the protrusions (coupling portion thickness/protrusion thickness) is preferably 0.5 or less, more preferably 0.4 or less, and even more preferably 0.3 or less such that the flow of the first fluid is less likely to be inhibited.

The material of the displacement/vibration reducing member is not particularly limited as long as the material is polymer. Considering the followability with respect to the displacement and vibration of the separator, elastomer, particularly, cross-linked rubber is preferably used. For example, if the same material as the first seal member is used, the displacement/vibration reducing member and the first seal member can be molded together.

As the method of molding the displacement/vibration reducing member using a gate, transfer molding or the like may be used other than injection molding in the above embodiments. In any case, the displacement/vibration reducing member may be integrally molded with the separator main body, or may be molded separately from the separator main body, and then bonded to the separator main body.

What is claimed is:

1. A fuel cell separator, comprising:
   a separator main body having a first surface on which a first fluid flows and a second surface on which a second fluid flows and that is bonded to an in-cell seal member disposed around an electrode member having a membrane electrode assembly; and
   a first seal member that is disposed on the first surface of the separator main body and that is in elastic contact with a counterpart member stacked on the separator main body;
   wherein when a region on the first surface of the separator main body corresponding to the electrode member disposed on the second surface is defined as a power generation region, and a region on the first surface of the separator main body corresponding to the in-cell seal member is defined as a seal region, a displacement/vibration reducing member made of polymer is disposed at a part of the seal region;

the displacement/vibration reducing member includes:
- a plurality of protrusions, and
- a coupling portion that has a thickness smaller than a thickness of the plurality of protrusions and that couples the protrusions;

when the displacement/vibration reducing member is viewed in plan view, an axis line connecting centers of figures of the adjacent protrusions does not coincide with a center line passing through a widthwise center of the coupling portion; and the coupling portion has a gate cut mark formed when the displacement/vibration reducing member is molded.

2. The fuel cell separator according to claim 1, wherein the separator main body has a through hole extending through in a thickness direction for supplying or discharging the first fluid; and the displacement/vibration reducing member is disposed between the through hole and the power generation region.

3. The fuel cell separator according to claim 1, wherein the coupling portion includes a plurality of coupling pieces disposed between the respective adjacent protrusions; and the plurality of protrusions are continuously coupled to each other via the coupling pieces.

4. The fuel cell separator according to claim 1, wherein a ratio of the thickness of the coupling portion to the thickness of the plurality of protrusions is 0.5 or less.

5. The fuel cell separator according to claim 1, wherein the displacement/vibration reducing member and the first seal member are made of the same material.

6. A method of manufacturing the fuel cell separator of claim 5, comprising:
molding the displacement/vibration reducing member and the first seal member integrally with the separator main body in a single injection molding process.

* * * * *